US010451212B2

(12) United States Patent
Siegler et al.

(10) Patent No.: US 10,451,212 B2
(45) Date of Patent: Oct. 22, 2019

(54) DEVICE AND METHOD FOR ATTACHING AN OPTICAL UNIT

(71) Applicant: Hilti Aktiengesellschaft, Schaan (LI)

(72) Inventors: Ralf Siegler, Waldburg (DE); Till Cramer, Malans (CH)

(73) Assignee: Hilti Aktiengesellschaft, Schaan (LI)

( * ) Notice: Subject to any disclaimer, the term of this patent is extended or adjusted under 35 U.S.C. 154(b) by 418 days.

(21) Appl. No.: 15/300,673

(22) PCT Filed: Mar. 26, 2015

(86) PCT No.: PCT/EP2015/056487
§ 371 (c)(1),
(2) Date: May 5, 2017

(87) PCT Pub. No.: WO2015/150202
PCT Pub. Date: Oct. 8, 2015

(65) Prior Publication Data
US 2017/0234477 A1    Aug. 17, 2017

(30) Foreign Application Priority Data

Mar. 31, 2014 (EP) .................... 14162673

(51) Int. Cl.
*F16M 13/02* (2006.01)
*F16M 11/04* (2006.01)
(Continued)

(52) U.S. Cl.
CPC .......... *F16M 11/041* (2013.01); *F16M 13/00* (2013.01); *F16M 13/02* (2013.01);
(Continued)

(58) Field of Classification Search
CPC ...... F16M 11/041; F16M 13/00; F16M 13/02; F16M 2200/02; G03B 17/561; G03B 17/566; Y10T 29/49826
See application file for complete search history.

(56) References Cited

FOREIGN PATENT DOCUMENTS

| DE | 196030 C | 1/1907 |
|---|---|---|
| DE | 1 256 901 B | 12/1967 |
| EP | 0 982 613 A1 | 3/2000 |

OTHER PUBLICATIONS

DE1256901 translation (Year: 1967).*

(Continued)

*Primary Examiner* — Sarang Afzali
*Assistant Examiner* — Ruth G Hidalgo-Hernandez
(74) *Attorney, Agent, or Firm* — Crowell & Moring LLP

(57) ABSTRACT

A device for fixing an optical device is disclosed. The device has a housing, an actuating device having an adjustable actuating element, an expansion sleeve having a plurality of expansion segments, which can be displaced in a plane perpendicular to a longitudinal axis of the expansion sleeve between a closed state and an expanded state, and a first adjusting device, which converts a movement of the actuating device into a radial movement of the expansion segments in the plane perpendicular to the longitudinal axis of the expansion sleeve. The expansion segments can be inserted into the receiving opening of the optical device in the closed state of the expansion sleeve and, in the expanded state, form a force-fitting or form-fitting connection with the receiving opening of the optical device.

15 Claims, 5 Drawing Sheets

(51) Int. Cl.
*F16M 13/00* (2006.01)
*G03B 17/56* (2006.01)
(52) U.S. Cl.
CPC ......... *G03B 17/561* (2013.01); *G03B 17/566* (2013.01); *F16M 2200/02* (2013.01)

(56) References Cited

OTHER PUBLICATIONS

PCT/EP2015/056487, International Search Report dated Apr. 28, 2015, with partial English translation (Five (5) pages).
European Search Report issued in European counterpart application No. 14162673.9-1751 dated Nov. 18, 2014, with Statement of Relevancy (Seven (7) pages).

\* cited by examiner

DEVICE AND METHOD FOR ATTACHING AN OPTICAL UNIT

This application claims the priority of International Application No. PCT/EP2015/056487, filed Mar. 26, 2015, and European Patent Document 14162673.9, filed Mar. 31, 2014, the disclosures of which are expressly incorporated by reference herein.

BACKGROUND AND SUMMARY OF THE INVENTION

The present invention relates to a device for attaching an optical unit to a holding apparatus as well as a method for attaching an optical unit.

When using optical units, one uses holding apparatuses to arrange an optical unit in the desired position. For the quick exchange of optical units on stands, quick-change adapters are known, which allow for a non-screwed connection of the optical unit to the stand. The known quick-change adapters comprise a clamping plate that is attached to the optical unit and an attachment plate that is attached to the stand, wherein the clamping plate can be attached to the attachment plate via a clamping mechanism. EP 0 982 613 B1 discloses a quick-change adapter with a clamping plate and an attachment plate, which has a swallowtail-shaped guide with a stationary first profile groove and a second profile groove that can be adjusted via a clamping mechanism. For attaching purposes, the clamping plate is inserted into the profile grooves and the second profile groove is pulled against the attachment plate by the clamping mechanism so that the clamping plate is fixed to the guide of the attachment plate.

This type of quick-change adapters has proven to be reliable and easy to handle; however, the known quick-change adapters are inflexible in regard to various clamping plates, since these must be matched precisely to the swallowtail-shaped guide of the attachment plate. In addition, the clamping plates must be adapted to the respective optical unit.

In contrast, the object of the present invention consists of developing quick-change adapters for optical units, which are suited for all optical units with a standardized thread receiver.

In doing so, the ease of handling and the high reliability of the known quick-change adapters are to be retained.

This task is achieved for the device mentioned earlier for attaching an optical unit according to the invention, and for the method mentioned earlier for attaching an optical unit. Advantageous developments are stated in the dependent claims.

The device according to the invention for attaching an optical unit, which comprises a cylindrical receiving opening, on a holding apparatus, has:
- a housing with a plurality of housing parts,
- an actuating device with an adjustable actuating element,
- an expansion sleeve with multiple expansion segments, which can be adjusted in a plane perpendicular to a longitudinal axis of the expansion sleeve between a closed state and an expanded state, and
- a first adjusting device, which transforms a movement of the actuating device into a radial movement of the expansion segments in the plane perpendicular to the longitudinal axis of the expansion sleeve, wherein the expansion segments, in the closed state of the expansion sleeve, can be inserted into the receiving openings of the optical unit and, in an expanded state of the expansion sleeve, form a force- or form-fitting connection with the receiving opening of the optical unit.

The device according to the invention enables one to attach an optical unit on a holding apparatus using the adjustable actuating element. To do so, the optical unit with the receiving opening is fit on the expansion sleeve, which is in a closed state. Then, the expansion segments are expanded by means of the actuating device and the first adjusting device in the plane perpendicular to the longitudinal axis of the expansion sleeve. In the expanded state, the expansion segments form a force- or form-fitting connection with the receiving opening of the optical unit.

The term "optical units" includes within the scope of the present invention all devices that utilize an optical or electro-optical component. Examples of optical units are laser receivers, laser distance measuring devices, line laser devices, rotating laser device, photo cameras, and video cameras. What all optical units have in common is that they have in the housing a cylindrical receiving opening, by means of which the optical unit can be attached to a holding apparatus. The base of the receiving opening can be circular, square, polygonal, or designed with another cross-sectional shape.

For a receiving opening with a circular base, there may also be provided on the outer surface an interior thread that can form a threaded connection with a complementarily designed exterior thread of a holding apparatus.

Among holding apparatuses, one differentiates between stands, which are positioned in a freestanding manner on a substrate, mobile holding apparatuses, and stationary holding apparatuses. Mobile holding apparatuses are handheld by users and can be moved in the room, such as measuring sticks, levelling rods, and poles. Stationary holding apparatuses use elements in the measuring environment, which have a different function and are used by the user; examples for stationary holding apparatuses are wall adapters, rail adapters, pipe adapters, and magnetic adapters. The device according to the invention is suited for all holding apparatuses, which secure an optical unit via a threaded connection. The holding apparatuses have a screw, which is screwed into a matching thread receiver on the optical unit.

Preferably, the first adjustment apparatus is designed as a core pin that can be adjusted along an axial direction, wherein the core pin is surrounded by expansion segments and the axial direction runs parallel to the longitudinal axis of the expansion sleeve. The core pin is surrounded by the expansion segments of the expansion sleeve, which are adjustable in a radial plane perpendicular to the longitudinal axis of the core pin. The translational movement of the core pin in the axial direction is transformed into a radial movement of the expansion segments perpendicular to the longitudinal axis of the core pin. By the radial movement of the expansion segments, the expansion sleeve can be adjusted between the closed state and the expanded state.

All directions parallel to the longitudinal axis of the expansion sleeve are defined as an axial direction, and all planes that are arranged perpendicular to the longitudinal axis of the expansion sleeve are defined as a radial plane. The radial direction is a direction that runs in a radial plane and cuts through the longitudinal axis of the expansion sleeve.

In a particularly preferred manner, the core pin has a cone section with cone-shaped exterior surfaces and the expansion segments have complementarily designed, cone-shaped interior surfaces, wherein the interior surfaces of the expansion segments slide along the exterior surfaces of the core pin during the movement of the core pin in an axial direction. The translational movement of the core pin in an axial direction is transformed by means of the cone section into the radial movement of the expansion segments. Due to the design of the cone-shaped exterior surfaces on the core pin and the cone-shaped interior surfaces on the expansion segments, the movement of the core pin in the axial direction can be converted into the radial movement of the expansion segments.

The cone-shaped exterior surfaces of the core pin can be integrated in a common surface, for example a cone or truncated cone surface, or the cone-shaped exterior surfaces are composed of multiple cone-shaped partial surfaces. A cone-shaped surface is a rotation surface that is formed by a curve rotating about an axis. For converting the translational movement of the core pin in the axial direction to a radial movement of the expansion segments, it is important that the exterior surfaces and interior surfaces assigned to each other are designed in a complementary manner.

In a particularly preferred manner, the core pin has, besides the cone section, a step section and a cylindrical section, wherein the cylindrical section is surrounded by a first spring element, which is clamped between the adjustable step section and one of the stationary housing parts of the housing. When the core pin is moved in an axial direction toward the expansion sleeve, the first spring element is compressed. The first spring element is preferably designed as a return spring and ensures that the expansion segments are moved back to their starting position when the actuating element is moved backward.

In a particularly preferred manner, the expansion segments have on each of their interior surfaces a first guide element and the core pin has two guide elements designed to complement the exterior surfaces, wherein the expansion segments are guided during the movement of the core pin in the axial direction by means of the first and second guide elements. The guide elements, which are designed as swallowtail guides for example, ensure that the expansion segments are moved by the core pin from the expanded stated to the closed state when opening the connection.

The first guide elements of the expansion segments are designed in a particularly preferred manner as a projection and the second guide elements of the core pin are designed in a particularly preferred manner as complementarily designed grooves. This design of the guide elements allows a compact configuration of the expansion sleeve.

In a preferred embodiment, the expansion elements each have on the exterior side a connecting section and a ring collar section, wherein the connecting sections in the expanded state from a force- or form-fitting connection with the receiving opening of the optical unit and the ring collar sections in the expanded state form in the axial direction a form-fitting connection with one of the stationary housing parts of the housing. The connecting sections are inserted into the receiving opening of the optical unit and can form a force- or form-fitting connection with the receiving opening. The type of connection, namely a force fit or a form fit, thereby depends on the exterior geometry of the connecting sections. The ring collar sections serve to secure the optical unit against a translational movement in the axial direction. By means of the radial movement of the expansion segments, the ring collar sections can grasp from behind one of the stationary housing parts and secure the optical unit on the adapter. The ring collar sections of the expansion segments can be designed in a one-piece manner or consist of a plurality of parts.

In a particularly preferred manner, the connecting sections of the expansion segments have an exterior thread, wherein the exterior thread forms a form-fitting connection with a receiving opening, designed as a thread receiver, of the optical unit in an expanded state. In doing so, the properties of the exterior thread are adapted in a particularly preferred manner to the interior thread of the thread receiver.

The expansion segments are in contact, on the interior side, with the core pin via cone-shaped interior surfaces; the interior surfaces of the expansion segments slide along the exterior surfaces of the core pin. The expansion segments are inserted in the receiving opening of the optical unit and can form on the exterior side a force- or form-fitting connection with the receiving opening. The structural design of the expansion segments on the interior sides is independent of the structural design of the expansion segments on the exterior sides. Thus, preferred designs of the expansion segments on the interior side, such as cone-shaped interior surface and guide element, can be combined in any desired manner with preferred designs of the expansion segments on the exterior side, such as a connecting section and ring collar section.

A development of the device provides for a clamping ring and a second adjusting device, wherein the second adjusting device transforms a movement of the actuating device into a movement of the clamping ring in the axial direction. By means of the clamping ring, which can be adjusted by means of the second adjusting device, a tilting of the optical unit relative to the longitudinal axes can be avoided or at least remedied. The structural design of the second adjusting device is independent of the first adjusting device with the core pin and expansion sleeve. For that reason, preferred designs of the first adjusting device can be combined in any desired way with preferred designs of the second adjusting device.

In a particularly preferred manner, the second adjusting device comprises a pressure plate and a plurality of cylindrical pins, wherein the cylindrical pins are surrounded by second spring elements, which are clamped between the adjustable pressure plate and one of the stationary housing parts of the housing. When the pressure plate is moved in an axial direction toward the expansion sleeve, the second spring elements are compressed. The second spring elements are preferably designed as return springs and ensure that the pressure plate is moved back to its starting position when the actuating element is moved back.

In a particularly preferred manner, the actuating element can be adjusted between a first position, a second position, and a third position, wherein the first adjusting device converts the movement of the actuating element between the first and second position into the radial movement of the expansion segments in the plane perpendicular to the longitudinal axis of the expansion sleeve, and the second adjusting device converts the movement of the actuating element between the second and third position into the movement of the clamping ring.

In a particular preferred manner, the actuating device comprises a control disk having a first control region and a second control region, wherein the first control region moves the core pin in an axial direction and the second control region moves the pressure plate in an axial direction. The adjustment region of the actuating device is divided into two angular regions: in the first angular region, the core pin is moved by the first control region in an axial direction, and in the second angular region, the pressure plate is moved by the second control region in an axial direction. The control curves of the first and second control regions are thereby preferably matched to each other in such a manner that in the first angular region, only the core pin is moved in an axial direction, and in the second angular region, only the pressure plate is moved in an axial direction.

The present invention also relates to a holding apparatus with a device according to the invention for attaching an optical unit. In a first preferred variant, the device according to the invention for attaching an optical unit can be connected in a detachable manner to the holding apparatus so that the device can be retrofitted for conventional holding apparatuses. In a second preferred variant, the device according to the invention for attaching an optical unit is connected to the holding apparatus in a non-detachable manner. The second variant is particularly suited for new holding apparatuses, which may be designed more compactly. All optical units with a standardized threaded connection can be attached to the holding apparatus.

The device according to the invention has the advantage that no modifications are necessary on the threaded connection of the optical units. Since the threaded connection of the optical units is not modified, all optical units can be attached to conventional holding apparatuses as well as to holding apparatuses that use the present invention.

According to the invention, the method for attaching an optical unit, which comprises a cylindrical receiving opening, on a quick-assembly adapter is characterized in that:
  the optical unit with the receiving opening is fitted on an expansion sleeve with a plurality of adjustable expansion segments, wherein the expansion sleeve is in a closed state, and
  the expansion segments are converted from a closed state into an expanded state by means of an actuating device and a first adjusting device in a plane perpendicular to a longitudinal axis of the expansion, wherein the expansion segments in an expanded state form a force- or form-fitting connection with the receiving opening of the optical unit.

The method, according to the invention, has the advantage that an optical unit can attach on a stand by means of an adjustable actuating element. The optical unit can be easily and quickly attached to the stand or detached from the stand by the user. The laborious opening and closing of the threaded connection In a preferred development of the method according to the invention, after placing the expansion sleeve into the expanded state, a clamping ring is moved by means of the actuating device and a second adjusting device in an axial direction parallel to the longitudinal axis of the expansion sleeve toward the optical unit. Using the clamping ring, which can be adjusted by means of the second adjusting device, a tilting of the optical device in relation to the longitudinal axes can be prevented or at least remedied.

Embodiments of the invention will be described below using the drawing. It is not intended to represent the embodiments to scale necessarily; rather the drawing, where useful for explanatory purposes, is executed in a schematic or slightly distorted form. In regard to supplements to teachings directly evident from the drawing, one shall refer to the relevant prior art. One shall thereby take into account that diverse modifications and changes pertaining to the form and detail of an embodiment can be undertaken, without deviating from the general idea of the invention. The invention features disclosed in the description, the drawings, as well as the claims may be relevant both individually per se as well as in any combination for the development of the invention. In addition, falling within the scope of the invention are all combinations of at least two of the features disclosed in the description, drawings, and/or claims. The general idea of the invention is not limited to the exact form or detail of the preferred embodiment shown and described below or limited to a subject matter that would be restricted in comparison to the subject matter claimed in the claims. For provided measurement ranges, values lying within the mentioned limits shall be disclosed as limits and may be used and claimed arbitrarily. For simplicity's sake, the same reference signs are used below for identical or similar parts, or parts with identical or similar functions.

DETAILED DESCRIPTION OF THE DRAWINGS

Figure 1A:
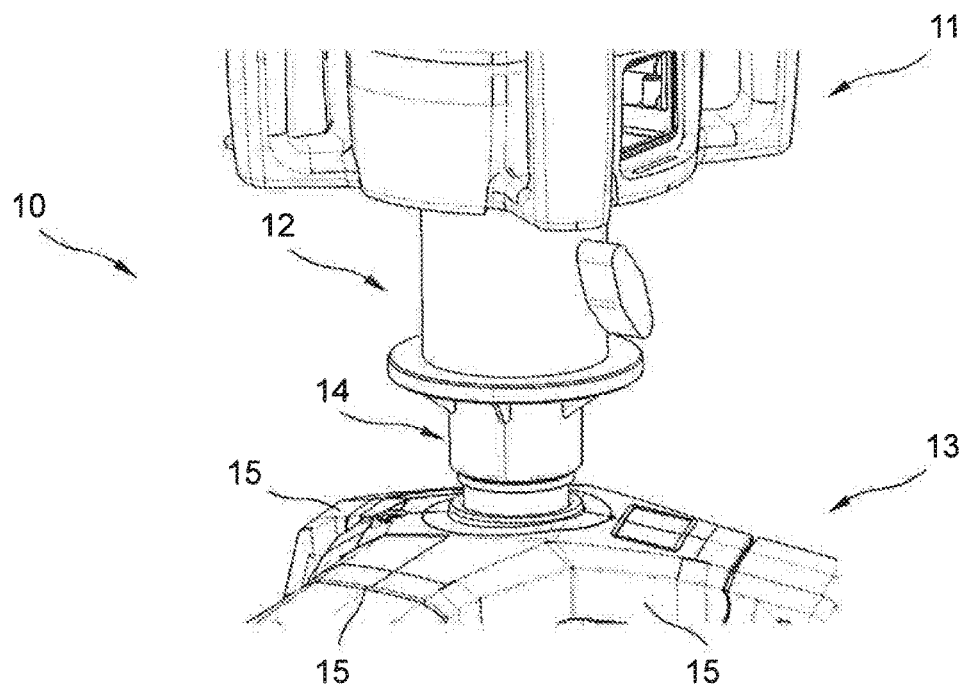
FIGS. 1A, B a device system with a rotating laser, which is attached to a stand using a quick-assembly adapter according to the invention (FIG. 1A) and the quick-assembly adapter of FIG. 1A in a magnified view (FIG. 1B)

FIG. 1A depicts a device system 10 with an optical unit 11, which is attached to a stand 13 as a holding apparatus using a device 12 constructed according to the invention as a quick-assembly adapter. Optical unit 11 is constructed as a rotating laser. Stand 13 is constructed as a tripod and comprises a stand head 14 as well as three stand legs 15, which are only partially depicted in FIG. 1A.

In the depicted embodiment, quick-assembly adapter 12 is designed as a separate adapter and is detachably attached to stand head 14 by means of a standardized threaded connection. As threaded connections for optical units 11, two thread types have established themselves:
a ¼-inch 20-pitch Whitworth thread for smaller optical units 11, and a ⅝-inch, 16-pitch Whitworth thread for larger optical units 11. On stand head 14, there is provided a stand screw, which is screwed into a matching thread receiver on quick-assembly adapter 12.

Figure 1B:
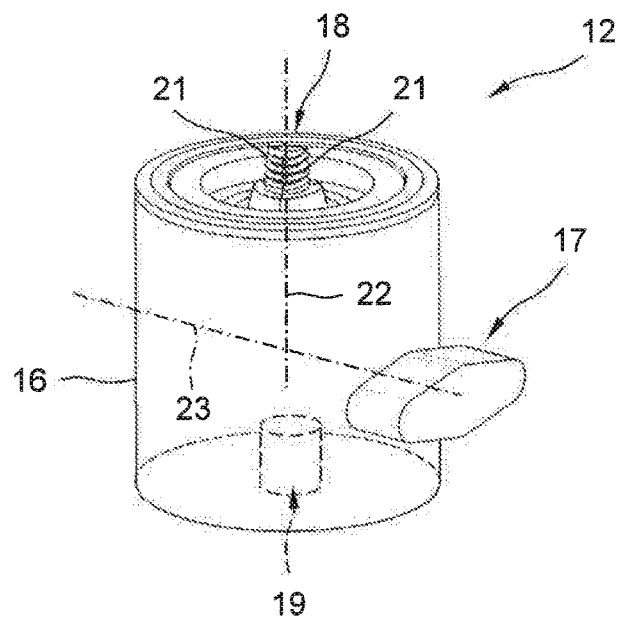

FIG. 1B depicts quick-assembly adapter 12 according to the invention of FIG. 1A in a magnified view. Quick-assembly adapter 12 comprises a housing 16, an actuating device 17, a first connecting device 18, which connects quick-assembly adapter 12 to rotating laser 11, and a second connecting device 19, which connects quick-assembly adapter 12 to stand 13. Second connecting device 19 is constructed as a thread receiver, which can form the threaded connection with a complementarily designed threaded pin of stand 13. If quick-assembly adapter 12 is integrated in stand head 14, the second connecting device is not necessary.

First connecting device 18 is constructed as an expansion sleeve and comprises a plurality of expansion segments 21, which can form a force- or form-fitting connection with the thread receiver of rotating laser 11. Expansion sleeve 18 can thereby be adjusted by a user between a closed and an expanded state by means of actuating device 17, wherein first connecting device 18 is depicted in a closed state in FIG. 1B. In the embodiment, expansion sleeve 18 comprises three expansion segments 21, which are arranged symmetrically about a longitudinal axis 22. Actuating device 17 can be adjusted about axis of rotation 23.

Figure 2:
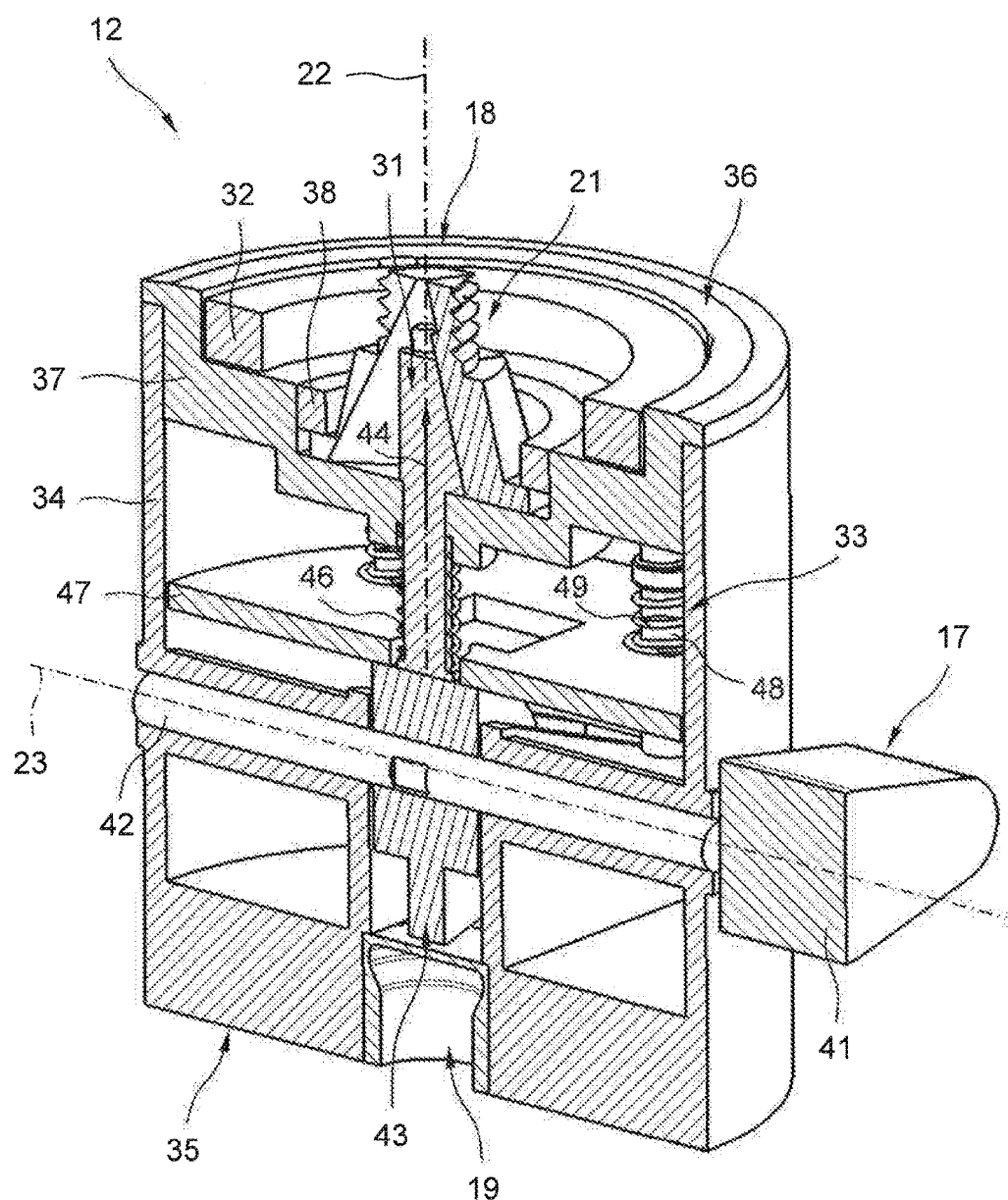
FIG. 2 the quick-assembly adapter of FIG. 1B with a housing, an actuating device, and an expansion sleeve, which can be adjusted between a closed and expanded state, in a longitudinal cross-section.

FIG. 2 depicts quick-assembly adapter 12 according to the invention of FIG. 1B in a longitudinal cross-section along a section plane, which contains longitudinal axis 22 and axis of rotation 23. Quick-assembly adapter 12 can be connected via first connecting device 18 to rotating laser 11 and via second connecting device 19 to stand 13.

First connecting device 18 designed as an expansion sleeve can be adjusted by the user between the closed state and the expanded state by means of actuating device 17. When the expansion sleeve is closed, rotating laser 11 can be placed on quick-assembly adapter 12 and expansion sleeve 18 can be inserted into the thread receiver of rotating laser 11. When rotating laser 11 is placed on quick-assembly adapter 12, expansion sleeve 18 is expanded by means of actuating device 17 so that rotating laser 11 is secured on quick-assembly adapter 12. The movement of actuating device 17 is transferred via a first adjusting device 31, designed as a core pin, to expansion segments 21 of expansion sleeve 18.

When the user does not place rotating laser 11 correctly on quick-assembly adapter 12, there is a risk that the axis of rotation of rotating laser 11 will not coincide with the longitudinal axes of quick-assembly adapter 12 and stand 13, but will be slightly tilted in relation to the longitudinal axes. To remedy a tilting of rotating laser 11 in relation to the longitudinal axes, quick-assembly adapter 12 has a clamping ring 32, which can be adjusted by means of a second adjusting device 33.

Housing 16 is constructed in a multi-part manner out of three stationary housing parts. The first housing part is constructed as a housing bowl 34 and has on a bottom side 35 thread receiver 19 for connecting quick-assembly adapter 12 to stand 13. On a top side 36, opposite bottom side 35, of quick-assembly adapter 12, the housing bowl is connected to the second housing part constructed as a housing cover 37. Housing cover 37 is constructed in a multi-step manner with a first step and a second step. Expansion segments 21 slide on the first step of housing cover 37 and, in a connected state, grasp from behind third housing part 38 designed in a ring-shaped manner. Clamping ring 32 lies on the second step of stationary housing cover 37.

The actuating device 17 comprises an actuating element constructed as a rotary switch 41, and a shaft 42, which is seated in the housing bowl 34, so as to rotate about axis of rotation 23. On shaft 42, there is a control disk 43 designed as an eccentric disk, which is non-rotatably connected to shaft 42. By means of control disk 43, a rotational movement of shaft 42 about axis of rotation 23 is converted into a translational movement of first adjusting device 31 or a translational movement of second adjustment device 33 along an axial direction 44. Axial direction 44 is thereby arranged parallel to the longitudinal axis of quick-assembly adapter 12.

Core pin 31 is surrounded by a first spring element 46, which is clamped between stationary housing cover 37 and core pin 31. When core pin 31 is moved in an axial direction 44 toward expansion sleeve 18, first spring element 46 is compressed. First spring element 46 is constructed as a return spring and ensures that expansion segments 21 are moved back to their starting position with the return movement of rotating switch 41. Core pin 31 is surrounded by expansion segments 21 of expansion sleeve 18, which can be adjusted in a plane perpendicular to the longitudinal axis of core pin 31. In the embodiment, three expansion segments 21 are provided, which are arranged symmetrically about longitudinal axis 22.

Second adjusting device 33 comprises a pressure plate 47, which contacts control disk 43, and four cylindrical pins 48. Clamping ring 32 is connected to pressure plate 47 via cylindrical pins 48 and constructed to be adjustable in axial direction 44 by means of second adjusting device 33. Cylindrical pins 48 are surrounded by second spring elements 49, which are clamped between stationary housing cover 37 and adjustable pressure plate 47. When pressure plate 47 is moved in axial direction 44 toward expansion sleeve 18, second spring elements 49 are compressed. Second spring elements 49 are designed as return springs and ensure that pressure plate 47 is moved back to its starting position with a return movement of rotation disk 41.

Figure 3:
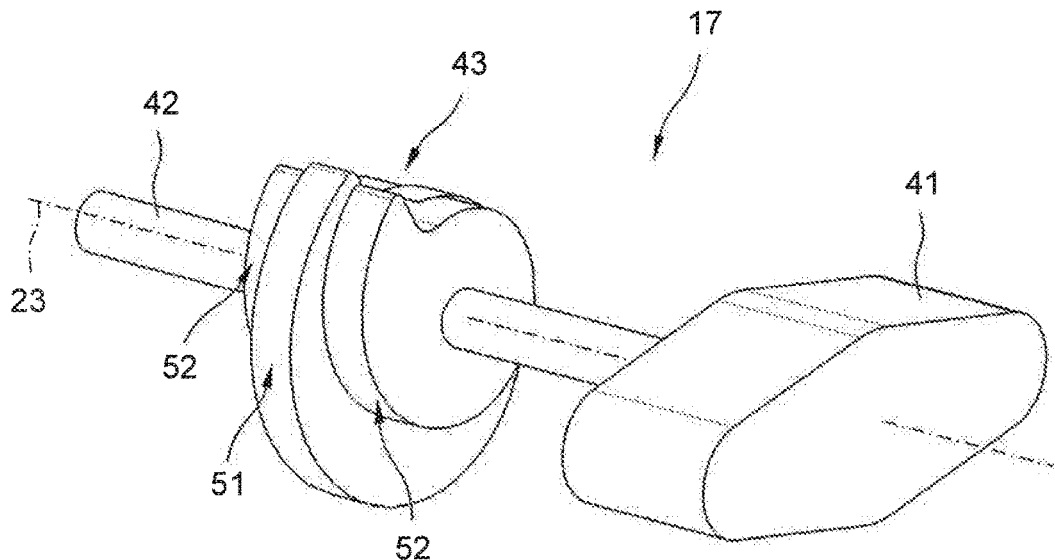
FIG. 3 the actuating device of the quick-assembly adapter of FIG. 1B in a magnified three-dimensional view.

FIG. 3 depicts actuating device 17 of quick-assembly adapter 12 of FIG. 1B in a magnified, three-dimensional view. Actuating device 17 comprises rotating switch 41, shaft 42, and control disk 43.

Control disk 43 is non-rotatably connected to shaft 42. By means of control disk 43, a rotational movement of shaft 42 about axis of rotation 23 is converted into a translational movement of first adjusting device 31 or a translational movement of second adjusting device 33 along axial direction 44. Control disk 43 comprises a first control region 51, which interacts with first adjusting device 31, and a second control region 52, which interacts with second adjusting device 33. First and second control region 51, 52 are integrated in a common control disk. Alternatively, separate control disks can be provided for the first and second control regions, which are non-rotatably connected to shaft 42.

Adjustment region of actuating device 17 can be divided into two angular regions; in a first angular region, core pin 31 is moved from first control region 51 in axial direction 44 and in a second angular region, pressure plate 47 is moved from second control region 52 in axial direction 44. In the embodiment, control curves of first and second control regions 51, 52 are thereby matched to each other in such a manner that in a first angular region only core pin 31 and in a second angular region only pressure plate 47, are moved in axial direction 44. The distance of first control region 51 to axis of rotation 23 increases in the first angular region and in the second angular region, the distance of second control region 52 from axis of rotation 23 is constant in a first angular region and increases in the second angular region.

Figure 4:
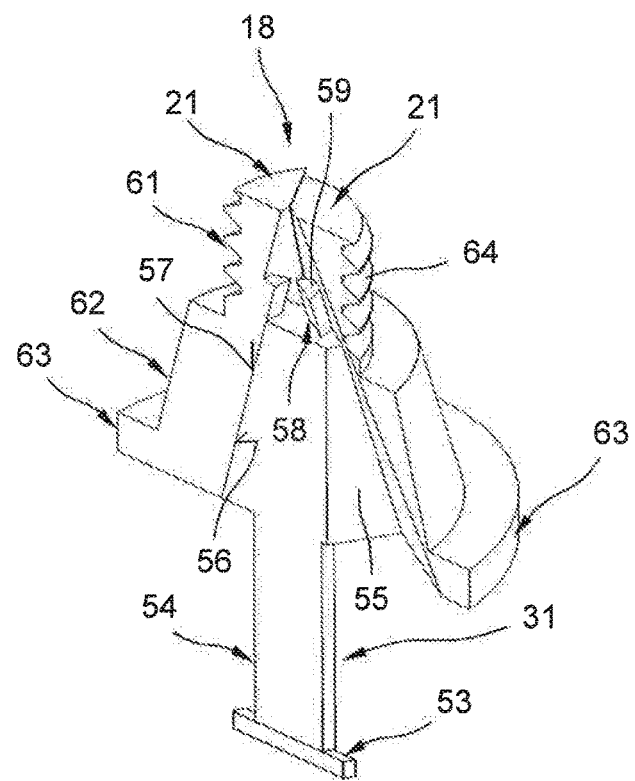
FIG. 4 the expansion sleeve of the quick-assembly adapter of FIG. 1B, which can be adjusted between the closed and expanded state by means of the actuating device and a first adjusting device constructed as a core pin, in a longitudinal cross-section.

FIG. 4 depicts expansion sleeve 18 of quick-assembly adapter 12 of FIG. 1B, which can be adjusted between the closed and expanded states by means of actuating device 17 and core pin 31, in a longitudinal cross-section along the section plane parallel to longitudinal axis 22 and axis of rotation 23.

Core pin 31 consists of a step section 53, which contacts control disk 43, a cylindrical section 54, and a cone section 55. Step section 53 contacts a first control region 51 of control disk 43 and transfers the rotational movement of control disk 43 to core pin 31. Cone section 55 is surrounded by expansion segments 21 of expansion sleeve 18. Expansion segments 21 have on the interior side conical interior surfaces 56, which are designed in a complementary manner to conical exterior surfaces 57 of core pin 31. The movement of core pin 31 in axial direction 44 is converted into a radial movement of expansion segments 21.

To guide expansion segments 21, conical exterior surfaces 57 of core pin 31 have three swallowtail-shaped grooves 58. Conical interior surfaces 56 of expansion segments 21 have swallowtail-shaped projections 59, which are designed to complement grooves 58 and are guided into grooves 58. While expansion segments 21 slide along conical exterior surfaces 57, expansion segments 21 are guided via projections 59 into grooves 58.

Expansion segments 21 are constructed on the exterior side of a plurality of sections and have a connecting section 61, a middle section 62, and a ring collar section 63. Ring collar section 63 serves to prevent a translational movement of rotating laser 11 in axial direction 44. Through the radial movement of expansion segments 21, ring collar sections 63 grasp from behind stationary third housing part 38 and secure rotating laser 11 on quick-assembly adapter 12. Middle section 62 connects ring collar section 63 to connecting section 61, which can form a force- or form-fitting connection with the receiving opening of rotating laser 11.

Connecting section 61 has an exterior thread 64, which, when expansion sleeve 18 is closed, can engage in a receiving opening, designed as a thread receiver, of rotating laser 11, and when expansion sleeve 18 is expanded, can form a form-fitting connection with the thread receiver. The properties of exterior thread 64 are advantageously adapted to the interior thread of the thread receiver. The thread section of expansion segments 21 can be replaced by a cylindrical section without threads, wherein the connection between expansion sleeve 18 and the receiving opening of rotating laser 11 is in this case designed as a force-fitting connection.

Figure 5A:
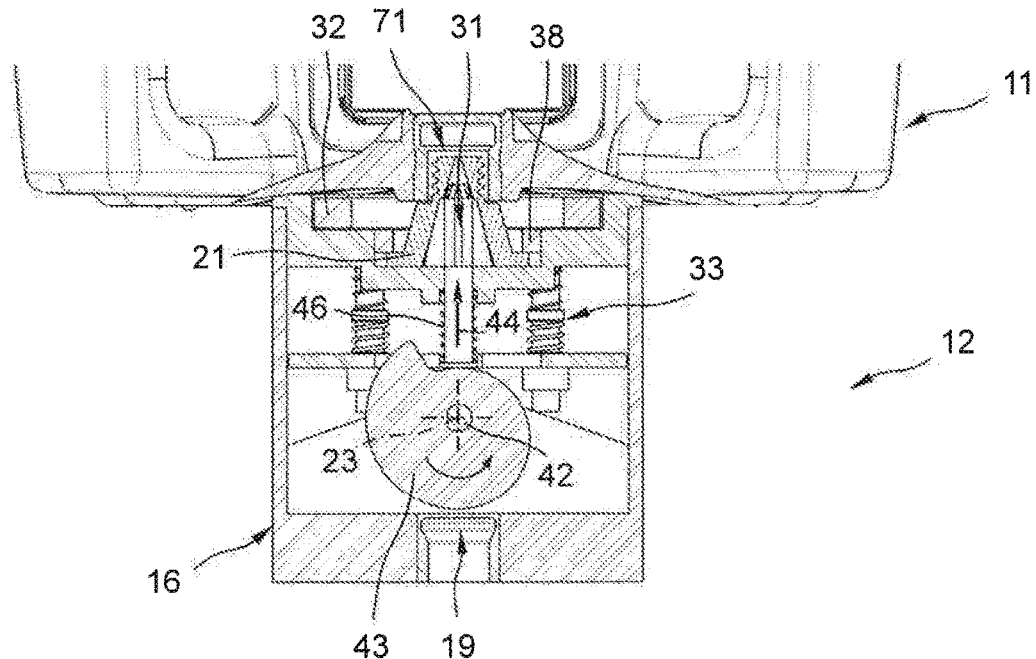
FIGS. 5A-C the quick-assembly adapter according to the invention with the rotating laser of FIG. 1A in a first position with a fitted rotating laser (FIG. 5A), a second position with a fixed rotating laser (FIG. 5B), and a third position with a fixed and aligned rotating laser (FIG. 5C).
Figure 5B:
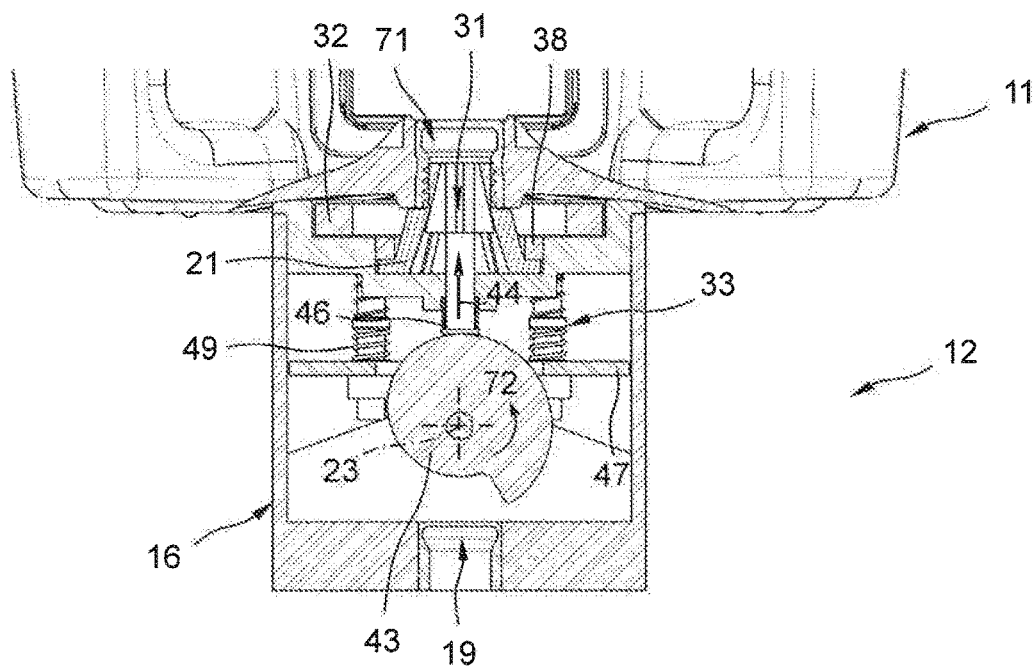
Figure 5C:
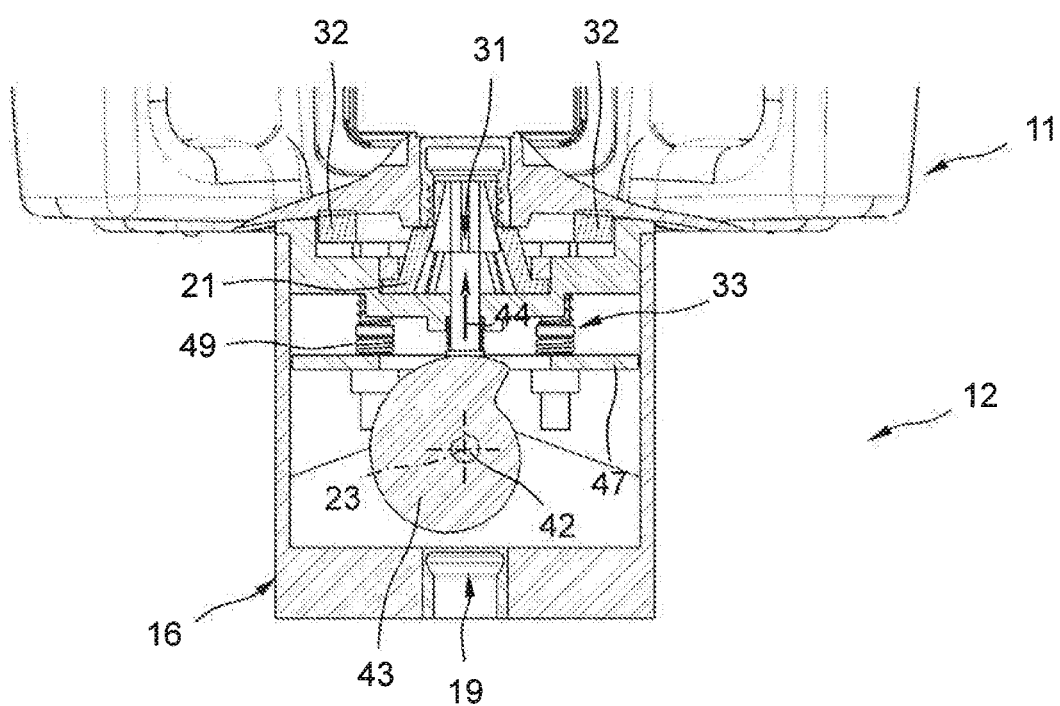

FIGS. 5A-C depict quick-assembly adapter 12 and rotating laser 11 of FIG. 1A while attaching rotating laser 11 to quick-assembly adapter 12 in various positions. FIG. 5A thereby depicts the fitted rotating laser 11 in a first position, FIG. 5B depicts the fixed rotating laser 11 in a second position, and FIG. 5C depicts the fixed and aligned rotating laser 11 in a third position.

FIG. 5A depicts rotating laser 11, which is fitted on expansion sleeve 18 using a receiving opening 71. Expansion sleeve 18 is closed and the connection between expansion sleeve 18 and receiving opening 71 of rotating laser 11 is opened. Rotary switch 41 of actuating device 17 is in the first position. To secure rotating laser 11 on quick-assembly adapter 12, the user moves rotary switch 41 from the first position in rotation direction 72 about axis of rotation 23 into the second position. The rotational movement of rotating switch 41 is transferred via shaft 42 to control disk 43. First control region 51 of control disk 43 contacts step section 53 of core pin 31 and moves core pin 31 in axial direction 44 toward expansion sleeve 18. The translational movement of core pin 31 in axial direction 44 is converted via cone section 55 into a radial movement of expansion segments 21.

At the end of the radial movement of expansion segments 21, ring collar sections grasp from behind third housing part 38 and the thread sections from with receiving opening 71 of rotating laser 11 a form- and force-fitting connection. FIG. 5B depicts rotating laser 11, which is fixed on adapter 12, in the second position. Expansion sleeve 18 is opened and expansion segments 21 form a form- and force-fitting connection with receiving opening 71 of rotating laser 11.

To coaxially align the longitudinal axes of rotating laser 11 and quick-assembly adapter 12, the user moves rotary switch 41 out of the second position in rotation direction 72 about axis of rotation 23 into the third position. The rotational movement of rotary switch 41 is transferred via shaft 42 to control disk 43. Second control region 52 of control disk 43 contacts pressure plate 47 and moves clamping ring 32 parallel to longitudinal axis 22 in axial direction 44 toward rotating laser 11.

FIG. 5C depicts rotating laser 11, which is secured on quick-assembly adapter 12 and whose axis of rotation is arranged coaxially to the longitudinal axis of quick-assembly adapter 12. Using clamping ring 32, which can be adjusted in axial direction 44 by means of the second adjusting device, a tilting of rotating laser 11 relative to the longitudinal axes can be prevented or at least remedied.

The invention claimed is:

1. A device for attaching an optical unit, wherein the optical unit includes a cylindrical receiving opening, on a holding apparatus, comprising:
   a housing with a plurality of housing parts; an actuating device with an adjustable actuating element coupled to the housing;
   an expansion sleeve with a plurality of expansion segments, wherein the plurality of expansion segments are adjustable in a plane perpendicular to a longitudinal axis of the expansion sleeve between a closed state and an expanded state; and
   a first adjusting device, wherein the first adjusting device converts a movement of the actuating device into a radial movement of the plurality of expansion segments in the plane perpendicular to the longitudinal axis of the expansion sleeve;
   wherein the plurality of expansion segments in the closed state are insertable into the cylindrical receiving opening of the optical unit and wherein the plurality of expansion segments in the expanded state form a force-fitting or a form-fitting connection with the cylindrical receiving opening of the optical unit; and a clamping ring and a second adjusting device, wherein the second adjusting device transforms the movement of the actuating device into a movement of the clamping ring in an axial direction.

2. The device according to claim 1, wherein the first adjusting device is a core pin that is adjustable along an axial direction, wherein the core pin is surrounded by the plurality of expansion segments, and wherein the axial direction runs parallel to the longitudinal axis of the expansion sleeve.

3. The device according to claim 2, wherein the core pin has a cone section with a cone-shaped exterior surface, wherein the plurality of expansion segments have a cone-shaped interior surface which is complementary to the cone-shaped exterior surface, and wherein the cone-shaped interior surface slides along the cone-shaped exterior surface in the axial direction when the core pin is moved.

4. The device according to claim 3, wherein the core pin has a step section and a cylindrical section, wherein the cylindrical section is surrounded by a first spring element which is clamped between the step section and one of the plurality of housing parts of the housing.

5. The device according to claim 3, wherein the cone-shaped interior surface has a first guide element, wherein the cone-shaped exterior surface has a second guide element, and wherein the plurality of expansion segments are guided during a movement of the core pin in the axial direction by the first and the second guide elements.

6. The device according to claim 5, wherein the first guide element is a projection and the second guide element is a groove.

7. The device according to claim 1, wherein the device is connected to a holding apparatus.

8. The device according to claim 7, wherein the device is detachably connected to the holding apparatus.

9. The device according to claim 7, wherein the device is non-detachably connected to the holding apparatus.

10. The device according to claim 1, wherein the plurality of expansion segments each have a connecting section and a ring collar section, wherein the connecting sections in the expanded state form the force-fitting or the form-fitting connection with the cylindrical receiving opening of the optical unit, and wherein the ring collar sections in the expanded state form in an axial direction a form-fitting connection with one of the plurality of housing parts of the housing.

11. The device according to claim 10, wherein the connecting sections have an exterior thread and wherein the exterior thread forms the form-fitting connection with the cylindrical receiving opening.

12. The device according to claim 1, wherein the actuating element is adjustable between a first position, a second position, and a third position, wherein the first adjusting device converts the movement of the actuating element between the first and the second positions into the radial movement of the plurality of expansion segments in the plane perpendicular to the longitudinal axis of the expansion sleeve, and wherein the second adjusting device converts the movement of the actuating element between the second and the third positions into the movement of the clamping ring.

13. The device according to claim 12, wherein the actuating device includes a control disk having a first control region and a second control region, wherein the first control region moves the core pin in the axial direction, and wherein the second control region moves the pressure plate in the axial direction.

14. The device according to claim 1, wherein the second adjusting device includes a pressure plate and a plurality of cylindrical pins, wherein the plurality of cylindrical pins are surrounded by respective second spring elements which are clamped between the pressure plate and one of the plurality of housing parts of the housing.

15. A method for attaching an optical unit, wherein the optical unit includes a cylindrical receiving opening, on a quick-assembly adapter, comprising the steps of:
   fitting the optical unit on an expansion sleeve with a plurality of adjustable expansion segments, wherein the expansion sleeve is in a closed state; and
   moving the plurality of adjustable expansion segments out of the closed state and into an expanded state in a plane perpendicular to a longitudinal axis of the expansion sleeve by an actuating device and a first adjusting device, wherein the plurality of adjustable expansion segments in the expanded state form a force-fitting or a form-fitting connection with the cylindrical receiving opening of the optical unit; and
   wherein, after the step of moving, a clamping ring is moved in an axial direction parallel to the longitudinal axis of the expansion sleeve toward the optical unit by the actuating device and a second adjusting device.

* * * * *